UNITED STATES PATENT OFFICE.

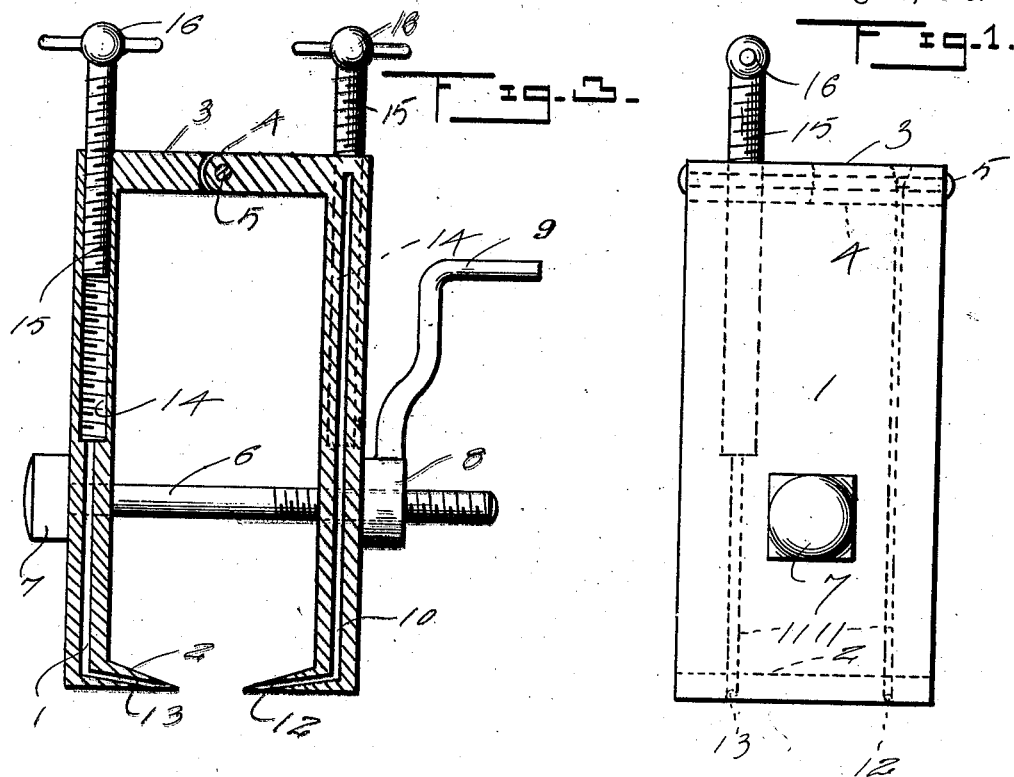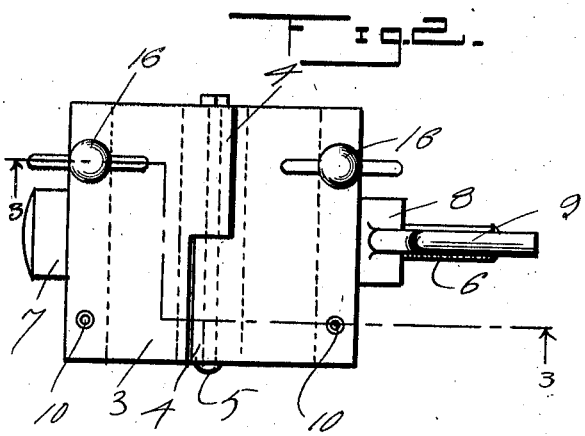

JOSEPH H. TREGONING, OF GREELEY, COLORADO.

LEAF-SPRING-LUBRICATING TOOL.

1,313,565.  Specification of Letters Patent.  Patented Aug. 19, 1919.

Application filed October 9, 1917. Serial No. 195,593.

*To all whom it may concern:*

Be it known that I, JOSEPH H. TREGONING, a citizen of the United States, residing at Greeley, in the county of Weld and State of Colorado, have invented certain new and useful Improvements in Leaf-Spring-Lubricating Tools; and I do hereby declare the following to be a full, clear, and exact description of the invention, such as will enable others skilled in the art to which it appertains to make and use the same.

The invention relates to a leaf-spring lubricating tool.

The object of the present invention is to provide a simple, practical and efficient lubricating tool of strong, durable and comparatively inexpensive construction adapted to be readily applied to upper and lower leaf-springs of automobiles and various other vehicles and capable of easy operation to spread the leaves sufficiently to introduce a lubricant between the same to the desired extent.

A further object of the invention is to provide a leaf-spring lubricating tool of this character equipped with a gravity feed for lubricating the leaves of the upper springs when the device is in an upright position, and provided also with a force speed for forcing oil or other lubricant between the leaves of a lower spring when the tool is inverted.

With these and other objects in view, the invention consists in the construction and novel combination of parts hereinafter fully described, illustrated in the accompanying drawing and pointed out in the claim hereto appended; it being understood that various changes in the form, proportion, size and minor details of construction, within the scope of the claim, may be resorted to without departing from the spirit or sacrificing any of the advantages of the invention.

In the drawing:

Figure 1 is a side view of the leaf-spring lubricating tool constructed in accordance with this invention.

Fig. 2 is a plan view of the same.

Fig. 3 is a vertical sectional view on the line 3—3 of Fig. 2.

Like numerals of reference designate corresponding parts in the several figures of the drawing.

In the accompanying drawing, in which is illustrated the preferred embodiment of the invention, the leaf-spring lubricating tool comprises in its construction two members each consisting of a plate or body 1 provided at the lower end with an inwardly projecting tapered spring-engaging portion 2 and having an inwardly extending top portion or arm 3, the top portions or arms 3 of the two members being provided with eyes 4 and hinged together by a pintle 5, preferably consisting of a bolt, as clearly shown in Fig. 2 of the drawing. The spring-engaging portions 2 are adapted to engage a spring at opposite sides thereof, and to be forced between the leaves of the spring for separating or spreading the leaves to enable a lubricant to be introduced in the said leaves. The sides or members of the tool are connected by an adjusting screw 6 piercing the plate 1 and provided at one end with a head 7 and having a nut 8 equipped with a handle 9 to enable it to be readily rotated for forcing the sides or members together.

Each side or member is provided with a pair of lubricating passages 10 and 11 extending from the top of the plate or body 1 to the lower end thereof and having angularly disposed portions 12 and 13 which extend along the engaging portions 2 of the sides or members to the transverse edges thereof so as to feed the oil or other lubricant between the leaves of the spring. The passage 10 extends from the top of the side or member and is open at the upper end to enable an oil can or other lubricant receptacle to supply the passage with oil for lubricating the leaves of a spring when the tool is operating in an upright position. The other lubricant passage 11 is provided with an enlarged or counterbored upper portion 14 forming a chamber and threaded to receive a threaded screw or plunger 15 adapted, when the tool is inverted, for operating on a lower spring, to force the oil or other lubricant out through the passage 11 into the spring. The threaded plunger or screw 15 is provided with a suitable operating handle 16.

The tool is operated by placing the engaging portions 2 on opposite sides of a spring and then rotating the nut 8 by the handle 9 until the said engaging portions 2 are forced between and spread the leaves of the spring. The lubricant is then supplied to the spring through one or other of the passages 10 and 11 of each of the sides or members. The threaded plunger or screw, by closing the chamber 14 at the top thereof and excluding the pressure of the atmosphere therefrom will prevent the leaking of the lubricant from the passage 11.

What is claimed is:

A leaf-spring lubricating tool including two sides or members hinged together at the top and provided at the bottom with inwardly extending tapered spring engaging portions adapted to spread the leaves, said sides or members being both provided with lubricant passages arranged in pairs, one member of each pair being enlarged to form a chamber, plungers operating in the chambers for forcing lubricant through the passages leading therefrom when the device is inverted, and means for adjustably connecting the sides or members.

In testimony whereof I affix my signature in presence of two witnesses.

JOSEPH H. TREGONING.

Witnesses:
GORDON H. JOHNS,
THOMAS HOUGHTON.

Copies of this patent may be obtained for five cents each, by addressing the "Commissioner of Patents, Washington, D. C."